Patented July 15, 1947

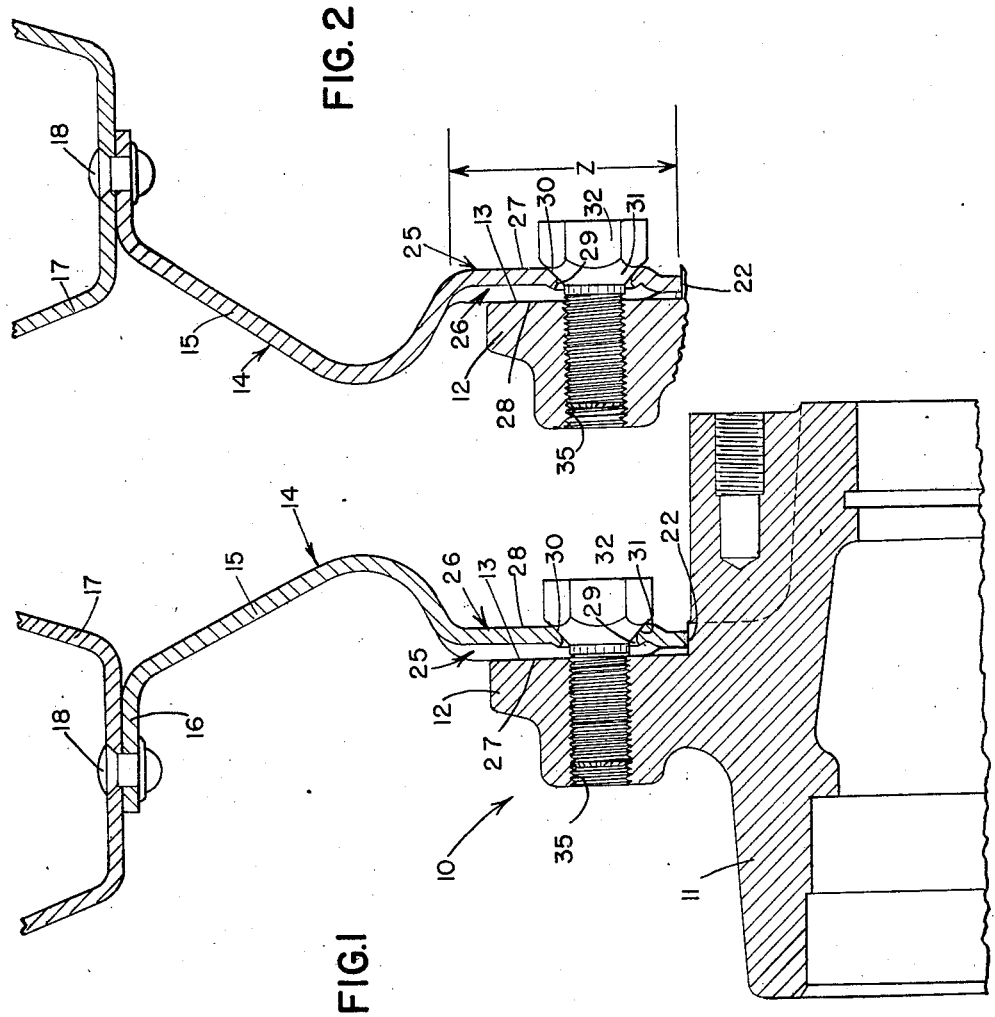

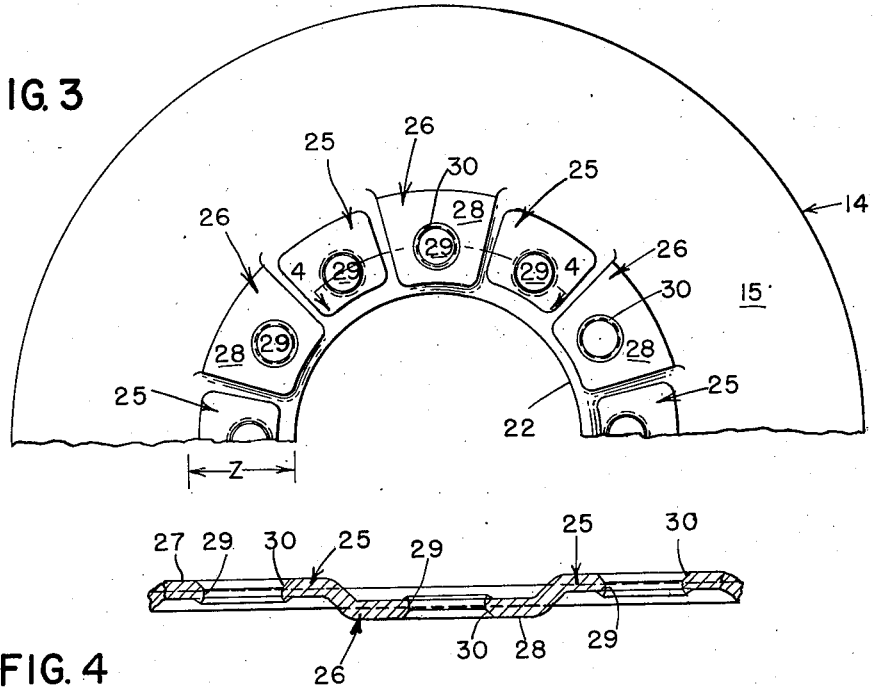
FIG. 3
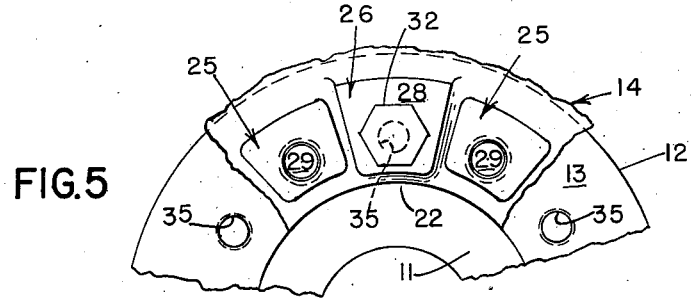
FIG. 4
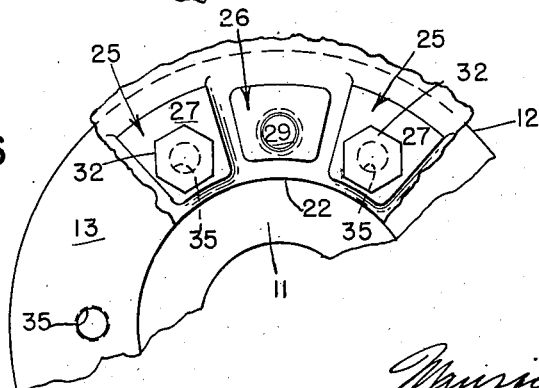
FIG. 5
FIG. 6

2,424,106

UNITED STATES PATENT OFFICE 2,424,106

REVERSIBLE WHEEL

Maurice J. Martens, East Moline, Ill., assignor to Deere & Company, Moline, Ill., a corporation of Illinois Application December 10, 1945, Serial No. 633,958

6 Claims. (Cl. 301—9)

1

The present invention relates generally to wheels and more particularly to pressed metal wheels of the reversible type, and has for its principal object the provision of a reversible wheel which is simpler in design and less difficult to construct than wheels of this type heretofore known to those skilled in the art.

Wheels of this type generally comprise a pressed metal wheel body which bolts onto a radially extending flange on a wheel hub and has offset areas pressed into the wheel body in spaced relation to the bolt holes therein to provide bearing faces which are clamped by the bolts against the face of the hub flange. The portions of the wheel body around the bolts are flexed inwardly when the latter are tightened to clamp the bearing faces against the flange, the stresses thus set up in the wheel body tending to prevent the bolts from becoming loose. Heretofore, the design and process of manufacture of reversible wheels of this general type have been complicated by the fact that the same holes are used to bolt the wheel body to the hub flange in both positions of the wheel, requiring an intricate arrangement of protruding bearing faces around each bolt hole offset axially in relatively opposite directions.

The present invention contemplates the use of two sets of bolt holes located within the areas of the two sets of oppositely offset bearing faces themselves, so that in one position of the body, one set of offset areas is used as bearing faces, while the bolts are inserted through the bolt holes provided in the other set of offset areas. When the wheel body is reversed, those areas which heretofore carried the bolts become the bearing surfaces against the hub flange, while the bolts are inserted through the other set of bolt holes.

This arrangement greatly simplifies the process of forming the wheel body, since it reduces the extent to which the metal must be drawn.

These and other objects and advantages of my invention will be apparent to those skilled in the art after a consideration of the following description, in which reference is had to the drawings appended hereto, in which Figure 1 is a fragmentary sectional elevational view taken along a radial plane passing through a wheel embodying the principles of the present invention, with the wheel body disposed in one of the two relatively reversed positions;

Figure 2 is a fragmentary sectional view taken through the hub flange and wheel body with the latter in the other of the two relatively reversed positions;

Figure 3 is a front elevational view of approximately one-half of the pressed metal wheel body and drawn to a reduced scale;

Figure 4 is a sectional fragmentary view taken along a line 4—4 in Figure 3 and drawn to an enlarged scale;

Figure 5 is a front elevational view showing a portion of the wheel hub and a portion of the wheel body bolted thereon in one of the two positions of the latter; and Figure 6 is a fragmentary front elevational view similar to Figure 5, but showing the wheel body bolted in the other of the two positions.

Referring now to the drawings, the wheel is indicated in its entirety by reference numeral 10 and comprises a conventional hub 11 having a radially extending flange 12, one side 13 of which lies substantially in a plane disposed perpendicular to the axis of the hub 11 and provides a supporting surface for the wheel body, indicated in its entirety by reference numeral 14.

The wheel body 14 comprises a sheet metal disk 15 pressed into a dished shape and provided with an outer peripheral flange portion 16 turned axially to support a conventional wheel rim 17, which is fixed thereto by any suitable means such as by rivets 18. The metal wheel body 14 has a central opening 22 for receiving the hub and an annular supporting zone Z around the opening 22 adapted to lie against the hub flange 12 with either face of the zone against the planar supporting surface 13 of the hub flange 12, thereby providing two relatively reversed positions of the wheel body, respectively. Inasmuch as the rim 17 is supported on the axially extending flange 16 of the wheel body 14, the rim 17 is thus positioned in two axially spaced positions relative to the hub flange 12 in the two reversed positions of the wheel body 14, respectively, as indicated by Figures 1 and 2.

The metal in the annular zone Z in the wheel body 14 is pressed or indented by methods well known to those skilled in the art, to form a plurality of circumferentially spaced protruding areas 25, 26 in the annular zone Z offset axially in opposite directions, alternately, from the inner edge 22, to provide spaced bearing faces 27, 28 adapted to contact the planar surfaces 13 of the hub flange 12 in the two relatively reversed positions of the wheel body, respectively, with alternate portions of the annular zone Z intermediate the bearing faces spaced axially from the planar surface 13 of the flange 12. Each of the alternately offset portions has a bolt receiving aperture 29 therein and each aperture 29 has a conical seating surface 30 in the respective bearing face 27 or 28, around the associated aperture 29, adapted to receive the conical shoulder 31 of a securing bolt 32, in seated relation in the conical seat 30.

The hub flange 12 is provided with a plurality of circumferentially spaced bolt holes 35 having internal threads adapted to receive the threaded bolts 32 which are inserted through the apertures 29. The bolt holes 35 are disposed on a bolt circle which is equal in diameter to that of the circle through the centers of the apertures 29 in the wheel body but the circumferential spacing between the bolt holes 35 is equal to twice the spacing between adjacent apertures 29, hence it will be evident that the hub flange bolt holes 35 will register with alternate apertures 29 in the wheel body 14.

The operation of mounting the wheel body 14 on the hub 11 will now be explained:

Assuming that the tire rim 17 is to be offset toward the left as viewed in Figure 1, the wheel body 14 is slid over the hub 11 in this position with the hub projecting through the central opening 22 in the wheel body, and is moved against the hub flange 12 with the bearing faces 27 of the offset areas 25 in direct contact with the radial supporting surface 13 of the hub flange 12. The wheel body is placed in such a position on the hub 11 that the bolt holes 35 are disposed in axial alignment with the apertures 29 in the intermediate zone portions or areas 26 which are offset axially away from the planar surface 13, as illustrated in Figures 1 and 5. The bolts 32 are now inserted through the aligned apertures 29 and holes 35 and are tightened down to seat the conical shoulders 31 in the conical seats 30, and inasmuch as the intermediate zone portions 26 are supported between the contacting areas 25, the bolts 32 can be tightened to flex the intermediate portions toward the hub flange 12, thereby setting up stresses in the wheel body 14 which maintains a pressure against the bolt shoulder 31, thereby preventing the bolts 32 from becoming loose.

To reverse the position of the wheel body 14 on the hub 11, the bolts are removed and the wheel body 14 is withdrawn from the hub, reversed in position to offset the tire rim 17 toward the right, as viewed in Figure 2, and replaced on the hub and slid into contact with the hub flange 12. It is necessary, however, to rotate the hub 11, slightly, as illustrated in Figure 6, to align the bolt holes 35 with the apertures 29 in the zone areas 25, which have been changed from bearing portions to intermediate offset portions, spaced away from the hub supporting surface 13. The alternately spaced offset areas 26 are now adjacent the hub flange 12 with their contact faces 28 bearing against the planar supporting surface 13. The bolts 32 are then inserted through the aligned bolt holes 35 and apertures 29 and tightened to flex the zone portions 25 between the contact faces 28 so that stresses are set up in the zone Z which maintains a pressure against the conical shoulders 13 of the bolts 32, thereby preventing the latter from loosening.

It will now be evident that in either of the two relatively reversed positions of the wheel body 14, the supporting zone Z bears against the supporting surface 13 of the hub flange 12 in circumferentially spaced contact areas, between which the wheel body is offset away from the hub flange 12. It is also clear that the zone portions 25 which are offset axially in one direction are provided with one set of bolt receiving apertures 29, while the alternate zone portions 26 are provided with a second set of bolt receiving apertures 29. Although in either position of the wheel body 14, either set of apertures 29 can be aligned with the bolt holes 35 in the hub flange 12, it is obvious that care must be taken to position the wheel body angularly relative to the hub 11 in either of the reversed positions, so that the bolt holes 35 are aligned with the set of apertures 29 in the zone portions or areas which are offset away from the hub flange 12, in order to obtain the flexing action that tends to prevent the bolts from loosening. It will be noted that an appreciable flexing of the metal in the supporting zone will be obtained, in view of the substantial spacing between the bearing faces which are in contact with the hub flange 12 and the apertures 29 in the intermediate zone areas through which the bolts are inserted. Furthermore, since the two sets of oppositely offset zone areas 25, 26 are substantially symmetrical, the amount of flexing action obtained is substantially equal in the two relatively reversed positions of the wheel body relative to the hub.

I claim:

1. A reversible wheel comprising a hub having a radially extending flange defining a substantially planar supporting surface provided with a plurality of circumferentially spaced openings, a pressed metal wheel body having an annular supporting zone adapted to lie against said hub flange with either face of said zone against said planar surface providing two relatively reversed positions of said wheel body, respectively, said wheel body having circumferentially spaced protruding areas in said zone offset axially in one direction to provide spaced bearing faces in contact with said hub flange supporting surface in one of said positions of said wheel body, the portions of said supporting zone intermediate said protruding areas providing spaced bearing faces in contact with said hub flange supporting surface in the other of said positions of said wheel body, each of said protruding areas and each intermediate portion of said zone being provided with an aperture, certain of said apertures being adapted to register with said hub flange openings in each of said positions of said wheel body, and securing means adapted for insertion through the apertures in those of said bearing faces which are not in contact with said hub flange and into the openings, in register therewith, to clamp the spaced bearing faces in contact with said supporting surface and flex said supporting zone between the bearing faces.

2. A reversible wheel comprising a hub having a radially extending flange defining a substantially planar supporting surface provided with a plurality of circumferentially spaced openings, a pressed metal wheel body having an annular supporting zone adapted to lie against said hub flange with either face of said zone against said planar surface providing two relatively reversed positions of said wheel body, respectively, said wheel body having circumferentially spaced protruding areas in said zone offset axially in one direction to provide spaced bearing faces in contact with said hub flange supporting surface in one of said positions of said wheel body, each of the portions of said supporting zone intermediate said protruding areas having an aperture adapted to register with one of said openings, a plurality of securing means adapted to be inserted through said registering apertures and openings to clamp said bearing faces in contact with said supporting surface and to flex said supporting zone between the bearing faces, said intermediate portions of said zone providing spaced bearing faces in contact with said hub flange supporting surface in the other of said positions of the wheel body, each of said protruding areas having an aperture adapted to register with one of said openings to receive said securing means for clamping said wheel body in said other position and to flex the protruding areas.

3. A reversible wheel comprising a hub having a radially extending flange defining a substantially planar supporting surface provided with a plurality of circumferentially spaced openings, a pressed metal wheel body having a central opening for receiving said hub and an annular supporting zone around said opening adapted to lie against said hub flange with either face of said zone against said flange, providing two relatively reversed positions of said wheel body, respectively, said wheel body having circumferentially spaced protruding areas in said annular zone offset axially in opposite directions, alternately, to provide spaced bearing faces adapted to contact said hub flange in either position of said wheel body with alternate portions of said annular zone intermediate said bearing faces spaced axially from said flange, each of said alternately offset portions having a bolt receiving aperture therein, and a plurality of securing bolts adapted to be inserted through said bolt receiving apertures, said bolts being disposed in the apertures in said intermediate zone portions spaced axially from said hub flange surface and engageable with said openings registering therewith to clamp said bearing faces against said flange surface and to flex said intermediate zone portions, the latter portions becoming the bearing faces when the wheel body is reversed, and the former bearing portions becoming the intermediate zone portions through which the bolts are inserted.

4. A reversible wheel comprising a hub having a radially extending flange defining a substantially planar supporting surface provided with a plurality of circumferentially spaced openings, a pressed metal wheel body having a central opening for receiving said hub and an annular supporting zone around said opening adapted to lie against said hub flange with either face of said zone against said flange, providing two relatively reversed positions of said wheel body, respectively, said wheel body having circumferentially spaced protruding areas in said annular zone offset axially in opposite directions, alternately, to provide spaced bearing faces adapted to contact said hub flange in either position of said wheel body with alternate portions of said annular zone intermediate said bearing faces spaced axially from said flange, each of said alternately offset portions having a bolt receiving aperture therein with a conical bolt seating surface in each bearing face around the associated aperture, and a plurality of securing bolts adapted to be inserted through said bolt receiving apertures and having conical shoulders to seat in said conical seats, said bolts being disposed in the apertures in said intermediate zone portions spaced axially from said hub flange surface and engageable with said openings registering therewith to clamp said bearing faces against said flange surface and to flex said intermediate zone portions, the latter portions becoming the bearing faces when the wheel body is reversed, and the former bearing portions becoming the intermediate zone portions through which the bolts are inserted.

5. The combination set forth in claim 3, characterized in that the number of bolts is equal to the number of openings in said hub flange, and the number of bolt receiving apertures in said wheel body is equal to twice the number of said openings, said openings being adapted to register with said apertures in the intermediate zone portions spaced from the hub flange in either of said relatively reversed positions of said wheel body.

6. A reversible wheel comprising a hub having a radially extending flange defining a substantially planar supporting surface provided with a set of circumferentially spaced openings, a pressed metal wheel body having a central opening for receiving said hub and an annular supporting zone around said opening adapted to lie against said hub flange with either face of said zone against said flange, providing two relatively reversed positions of said wheel body, respectively, said wheel body having circumferentially spaced protruding areas in said annular zone offset axially in opposite directions, alternately, to provide spaced bearing faces adapted to contact said hub flange in either position of said wheel body with alternate portions of said annular zone intermediate said bearing faces spaced axially from said flange, the intermediate zone portions spaced from said flange having a set of bolt receiving apertures therein, respectively, adapted to register with said openings in said hub flange, and a set of securing bolts adapted to be inserted into said registering sets of apertures and openings, respectively, to clamp said bearing faces against said hub flange and to flex said intermediate portions in one position of said wheel body, said bearing faces having a set of bolt receiving apertures therein, respectively, adapted to register with said set of openings in said hub flange to receive said bolts, respectively, when said wheel body is disposed in the other position to position the last named bearing faces in axially spaced relation to said hub flange.

MAURICE J. MARTENS.